United States Patent
Benham

(10) Patent No.: US 6,781,607 B1
(45) Date of Patent: Aug. 24, 2004

(54) METHOD AND SYSTEM FOR DYNAMICALLY DETERMINING THE APPROPRIATE INFORMATION AND/OR USER INTERFACE FOR PRESENTATION TO DIFFERING USERS

(75) Inventor: Shawn Edward Benham, San Ramon, CA (US)

(73) Assignee: International Business Machines Corporation, Armonk, NY (US)

(*) Notice: Subject to any disclaimer, the term of this patent is extended or adjusted under 35 U.S.C. 154(b) by 0 days.

(21) Appl. No.: 09/492,253

(22) Filed: Jan. 27, 2000

(51) Int. Cl.[7] ................................................ G06F 6/00
(52) U.S. Cl. ........................................ 345/744; 345/733
(58) Field of Search ................................ 345/762, 744, 345/708, 740, 797, 733

(56) References Cited

U.S. PATENT DOCUMENTS

| | | | |
|---|---|---|---|
| 5,432,934 A | | 7/1995 | Levin et al. |
| 5,493,692 A | * | 2/1996 | Theimer et al. ............ 455/26.1 |
| 5,606,702 A | | 2/1997 | Diel et al. |
| 5,726,883 A | | 3/1998 | Levine et al. |
| 5,920,848 A | * | 7/1999 | Schutzer et al. .............. 705/42 |
| 6,021,496 A | * | 2/2000 | Dutcher et al. ............. 713/202 |
| 6,088,732 A | * | 7/2000 | Smith et al. ................ 709/229 |
| 6,157,953 A | * | 12/2000 | Chang et al. ............... 709/225 |
| 6,360,254 B1 | * | 3/2002 | Linden et al. .............. 709/219 |

* cited by examiner

*Primary Examiner*—Cao (Kevin) Nguyen
(74) *Attorney, Agent, or Firm*—Sawyer Law Group LLP

(57) ABSTRACT

The present invention provides a method and system for providing information and/or an interface in a computer system. The method includes determining that a user is accessing the system; analyzing the user's role in the system without a need for the user to provide a description of the user; returning an estimate of the user's role based upon the analyzing step; and displaying or modifying the information and/or the interface based upon the returned estimate. The method and system in accordance with the present invention dynamically determines the appropriate information and/or interface for presentation to differing users. The present invention provides the means for information and graphical user interface (GUI) creators to present different information or GUIs to different user types, such as administrators and end users, and to different user experience levels, such as expert and novice, without requiring users to describe themselves. The present invention accomplishes this by performing a programmatic analysis of a user's rights within a system to derive type and experience level information using information already available according to the standards used by the system.

19 Claims, 3 Drawing Sheets

METHOD AND SYSTEM FOR DYNAMICALLY DETERMINING THE APPROPRIATE INFORMATION AND/OR USER INTERFACE FOR PRESENTATION TO DIFFERING USERS

FIELD OF THE INVENTION

The present invention relates to computer systems, and more particularly to providing information or user interfaces in computer systems.

BACKGROUND OF THE INVENTION

Various methods of providing multiple user interfaces in computer systems are well known in the art. Some of these methods attempt to vary the user interface, and the information provided therein, according to the user. In these methods, the user interface is changed based upon information the user provides about himself or herself. For example, the user may create a personal profile or answer a set of questions which are then stored on a computer system. The user's level of authority and experience in working with a particular system may be determined from the profile or answers, and the displayed information and/or interface are changed to match them. However, these conventional methods are cumbersome since they need the user to manually create the profile or answer the questions. In addition, if the user wishes the information and/or user interface display to be changed again, the user must change the profile or the answers. Thus, even if the user's experience level, for example, has improved, the information and/or interface displayed does not change accordingly unless the user affirmatively changes his or her profile or answers. The conventional methods are thus static.

Accordingly, what is needed is a system and method for dynamically determining the appropriate information and/or interface for presentation to differing users. The present invention addresses such a need.

SUMMARY OF THE INVENTION

The present invention provides a method and system for providing information and/or an interface in a computer system. The method includes determining that a user is accessing the system; analyzing the user's role in the system without a need for the user to provide a description of the user; returning an estimate of the user's role based upon the analyzing step; and displaying or modifying the information and/or the interface based upon the returned estimate. The method and system in accordance with the present invention dynamically determines the appropriate information and/or interface for presentation to differing users. The present invention provides the means for information and graphical user interface (GUI) creators to present different information or GUIs to different user types, such as administrators and end users, and to different user experience levels, such as expert and novice, without requiring users to describe themselves. The present invention accomplishes this by performing a programmatic analysis of a user's rights within a system to derive type and experience level information using information already available according to the standards used by the system.

DETAILED DESCRIPTION

The present invention relates to a method and system for dynamically determining the appropriate information and/or interface for presentation to differing users. The following description is presented to enable one of ordinary skill in the art to make and use the invention and is provided in the context of a patent application and its requirements. Various modifications to the preferred embodiment and the generic principles and features described herein will be readily apparent to those skilled in the art. Thus, the present invention is not intended to be limited to the embodiment shown but is to be accorded the widest scope consistent with the principles and features described herein.

The method and system in accordance with the present invention provides the means for information and graphical user interface (GUI) creators to present different information or GUIs to different user types, such as administrators and end users, and to different user experience levels, such as expert and novice, without requiring the users to describe themselves. The present invention accomplishes this by performing a programmatic analysis of a user's rights within a system to derive type and experience level information.

Figure 1:
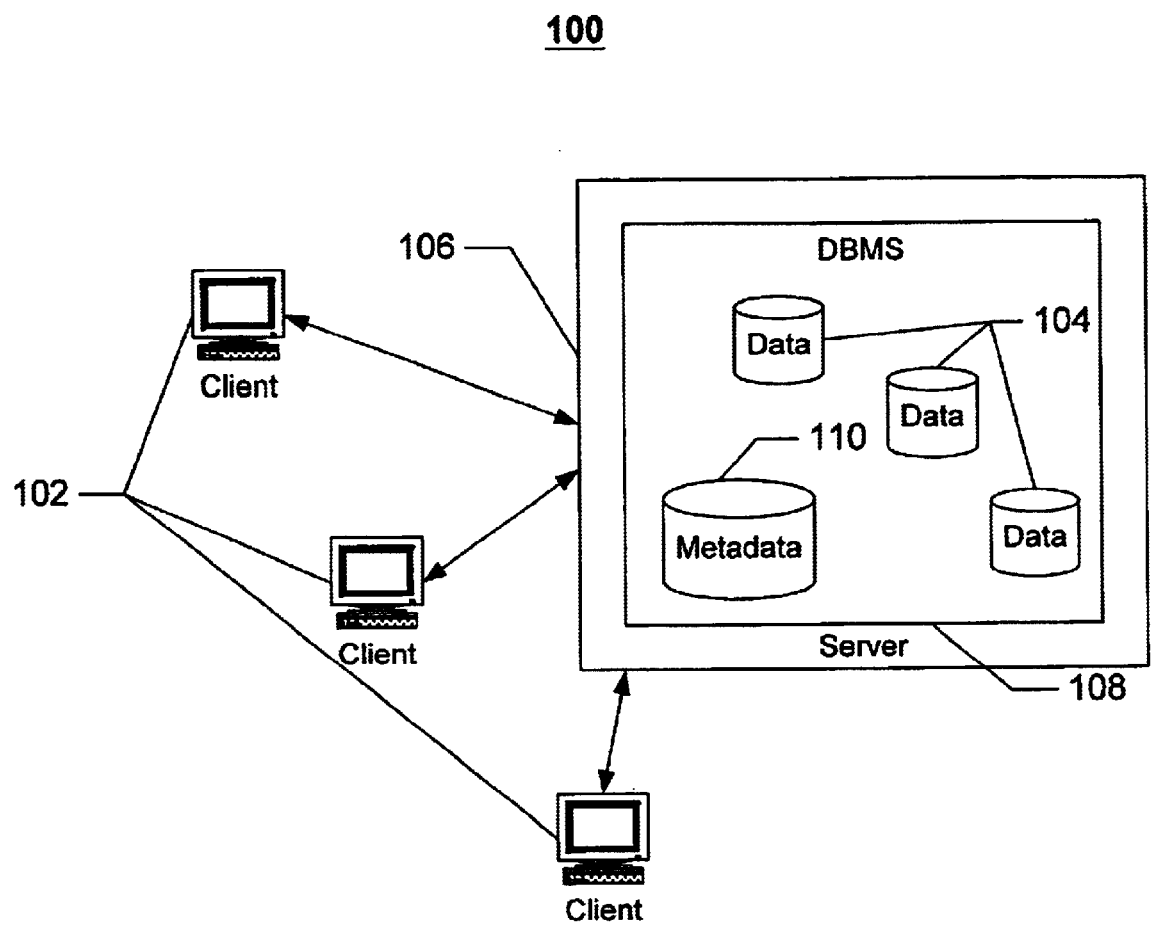
FIG. 1 is a block diagram illustrating a computer system which may utilize a method in accordance with the present invention.

FIG. 1 is a block diagram illustrating a computer system which may utilize a method in accordance with the present invention. For the purpose of describing a preferred embodiment of the present invention, the system 100 is a relational database management system (RDBMS) which adheres to the SQL92 standard. One RDBMS that follows the SQL92 standard is the DB2™ RDBMS, developed by International Business Machines Corporation™. The system 100 includes a plurality of clients 102 from which a user may access a plurality of relational databases 104 via the database management system 108. The metadata 10 contains data about the customer data in data 104, the system 100, and system users. Programs exist on the clients 102 through which users may access the databases 104. The programs display or present appropriate information and/or interfaces for this purpose. Program instructions reside on each client 102 for changing this display for differing users in accordance with the present invention.

Each database 104 is a collection of data, primarily organized in the form of tables. Each database 104 has a set of system catalog tables, which are automatically maintained by the system 100, containing information about the objects that are stored in the database 104 and about users of the database 104 and their access privileges. These and other aspects of RDBMS's adhering to SQL92 are well known in the art and will not be further described here.

Although the preferred embodiment of the present invention will be described below in the context of the relational database system 100, it is applicable to any system where there is structured data (such as relational, hierarchical, and object-oriented data) and user information stored with the structured data.

Figure 2:
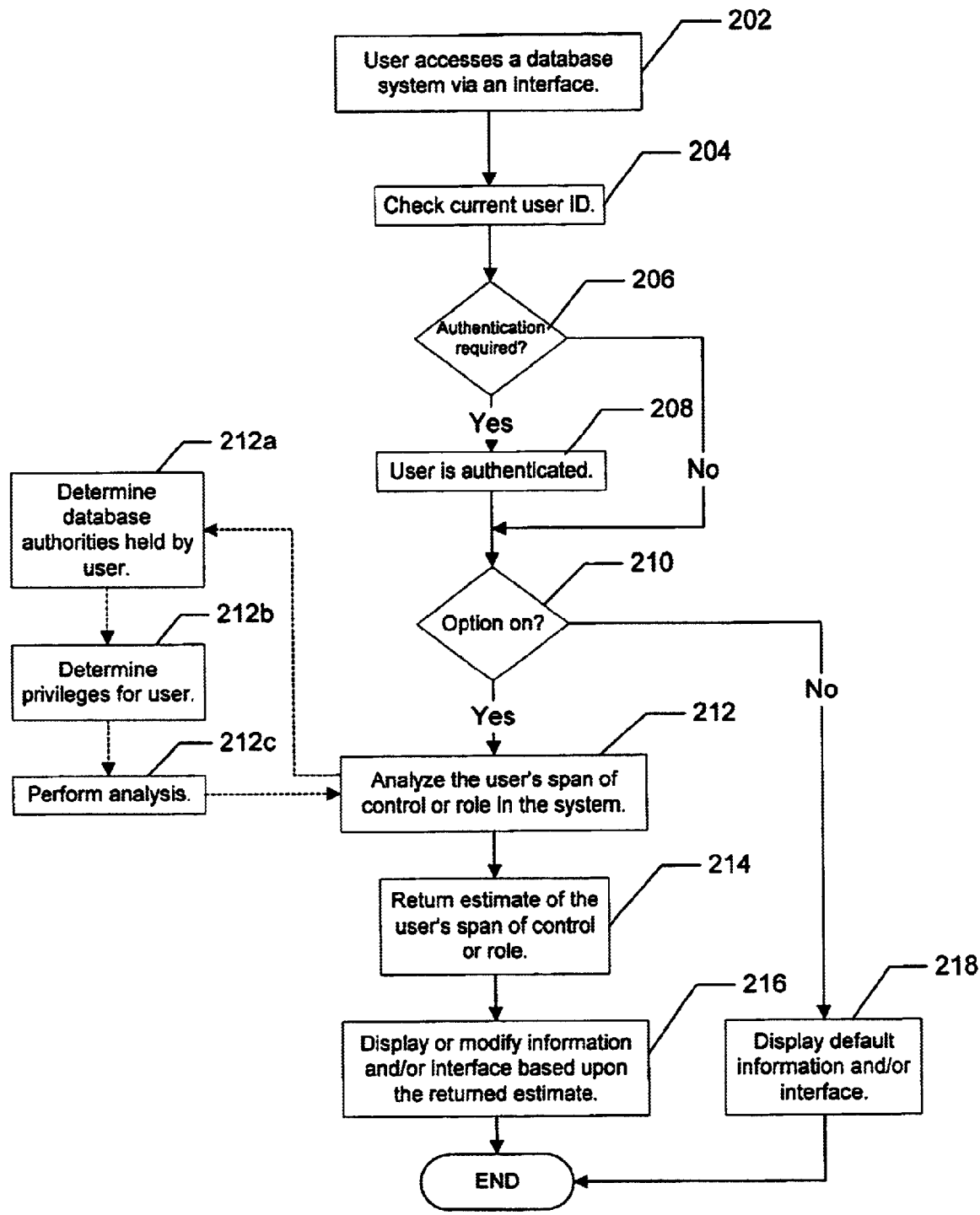
FIG. 2 is a flow chart representation of a preferred embodiment of a method for dynamically determining the appropriate information and/or interface for presentation to differing users in accordance with the present invention.

FIG. 2 is a flow chart representation of a preferred embodiment of a method for dynamically determining the appropriate information and/or interface for presentation to differing users in accordance with the present invention. First, a user accesses a database system via an interface, via step 202. In the preferred embodiment, the interface is a Graphical User Interface (GUI). The user may be logging into the system 100, performing a database operation or simply browsing the structure tree for the system 100. The user's ID is checked, via step 204. If the user must be authenticated before allowing the user further access, via step 206, then the user is authenticated, via step 206. The changing of the appropriate information and/or interface before and after user ID authentication is described in more detail later in this Specification. In the preferred embodiment, the user has the option to turn on/off the changing of the information and/or interface presentation, via step 210. Some users will prefer the consistent display of the default information and/or interface, via step 218, where all information is available.

If a user has turned the option on, then an analysis is performed to estimate the user's span of control or role in the system 100 without the need for the user to provide a description of the user, via step 212. A user's "span of control" or "role", as used in this specification, refers to the relative influence or power the user has in the database system. In analyzing the user's span of control, the database authorities held by the user and the privileges for the user are determined, via steps 212a and 212b. The analysis is then performed, via step 212c. The greater the user's span of control, the greater the likelihood that this user possesses expertise and has a high experience level. This analysis is described in more detail later in this specification.

Once the analysis returns an estimate of the user's span of control, via step 214, the appropriate information and/or interface based upon the returned estimate is displayed or modified, via step 216. In this manner, display of the information and/or interface is dynamically changed for the user without the need for the user to provide information about himself or herself.

In the analysis of step 212, data already available according to conventional RDBMS standards are used in estimating a user's span of control. In this context, some factors which may be used in the analysis include the following:

(1) Authorities/Roles: An authority is a named collection of privileges. For example, in DB2, SYSADMIN and SYSCTRL are authorities. If the user has the SYSADM level of authority, he or she typically has a high level of experience and expertise and may need to see all database interface options/fields and all database information topics that are available. More importantly, the presentation specifics can be adjusted so that overview topics, which experts traditionally avoid, are deprecated or lowered, and reference information, typically sought by experts, is pushed to the top.

(2) Privileges: A privilege is the right to access a specific database object in a specific way. A user with the authority to grant and revoke many privileges, i.e., a grantor, has a greater span of control than a user who is only a recipient of privileges to view or execute objects. Examples of privileges include those described in items (3) through (5) below.

(3) Schema Privileges: A schema is a collection of database objects. Once a schema is created, tables, views, and other objects may be created within this logical collection. If the user has the ability to modify or create objects in numerous schemas, then this indicates a broad span of control, particularly if the user can modify a large number of schemas other than a schema based on the user's ID.

(4) Table Privileges: If the user has the ability to create or modify the tables of a database, then the user typically has a higher level of experience and expertise, than a user who only has the ability to access the data. If the user has created or can modify numerous tables, then this indicates a broader span of control than users without the ability to create or modify tables.

(5) Packages and/or Database Programmatic Construct Privileges: Packages are control structures used to execute Structured Query Language (SQL).statements. A user who creates packages and grants permission to other users to execute packages typically has a higher level of expertise and experience than users who only have permission to execute packages. Package creators, typically, would need access to more system features than package users. Moreover, package creators would typically need access to more information at a detailed level than package users. Examples of other database programmatic constructs include functions and stored procedures.

The authorities and privileges for a database are typically stored as metadata 110 in RDBMS system catalog tables. This metadata 110 is available for analysis via system catalog views and standard API calls. In DB2, relevant catalog views include but are not limited to SYSCAT.DB-AUTH which contains the authorities for the database; SYSCAT.SCHEMAAUTH which contains the schema privileges; SYSCAT.TABAUTH which contains the table privileges; and SYSCAT.PACKAGEAUTH which contains the package privileges. These catalog views are well known to those in the art familiar with DB2 and will not be further described here. Once the authorities and privileges are obtained from these catalog views, the analysis, via steps 212a–212c, is performed as described above.

The five factors mentioned above are only example factors for an analysis. Other information already available according to conventional RDBMS standards may be used to estimate a user's span of control. The relative weight provided by the analysis to the individual authorities and privileges available to a user may be varied depending on the system. The analysis in accordance with the present invention is thus flexible and may be fine tuned to the needs of a particular system.

Example analyses include the following:

(1) Issuing statements against the database system catalog tables to determine if the user has a specific authority and/or role.

(2) Determining if a user has a range of power or influence over many parts of the database. For example, a simple approach is to divide the number of schemas that a given user has the ability to change/manipulate above and beyond that schema that matches the user's identity (ID), by the total number of schemas within a given database. In other words, POWER/RANGE=(# of SCHEMA_WITH_CREATIN_PRIV-ILIGES-1) ALL_SCHEMAS.

After performing the initial analysis to determine the number of schemas an ID can change/manipulate, the results are ranked. The system could then infer a status for the ID based on the ranking. For example, if the ranking for the ID is in the top 25% of all user ID rankings, then the user is inferred to be an "expert".

(3) Discovering if a particular user is responsible for providing applications or database programmatic constructs to other users. Package privileges can be used to distinguish between database system users and database system application programmers. In general, users who create packages are typically more experienced than users that only call or execute packages, and users who create packages typically require more information than users calling packages. A simple approach that could take advantage of this tendency is to determine how many packages a user has created. But one could do more than that. Another way to reach the true level of expertise is to determine how many specific users or groups are using the package created by the user. If a user has created a relatively large number of packages that are used by a relatively large number of other users and groups, a level of experience and technical expertise can be inferred from that data. If the user has not created any packages, but has the ability to execute many packages created by other users, this user might have less expertise. In other words:

POWER/RANGE=(#_of_PACKAGES_CREATED x#_of_us-
ers_and_groups_that_can_execute_this package)/# of
PACKAGES_USER_CAN_EXECUTE, where results greater than 1 indicate an experienced user, and fractions indicate the opposite.

Figure 3A:
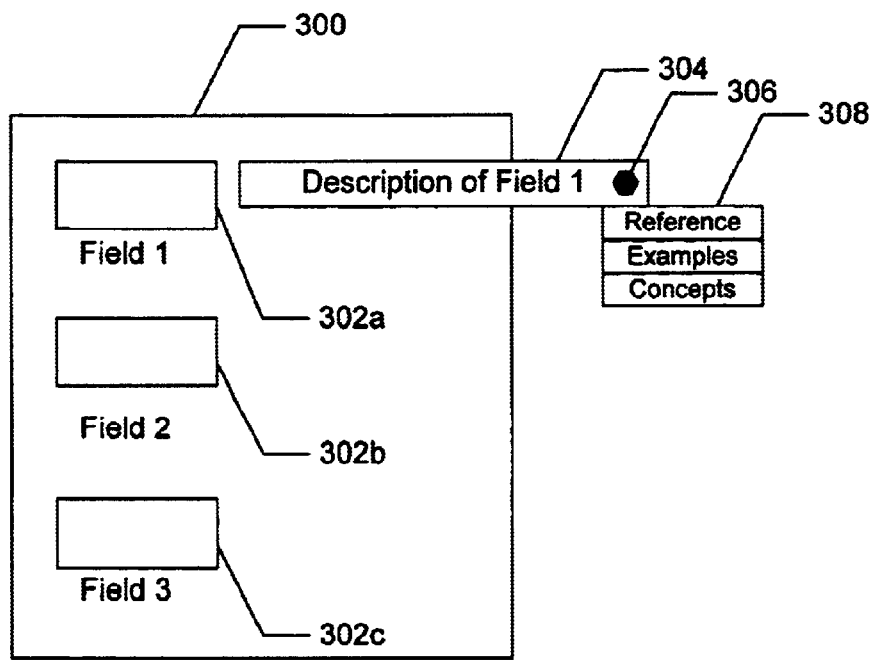
FIGS. 3A and 3B show example interfaces in demonstration of the preferred embodiment of the method for dynamically determining the appropriate information and/or interface for presentation to differing users in accordance with the present invention.
Figure 3B:
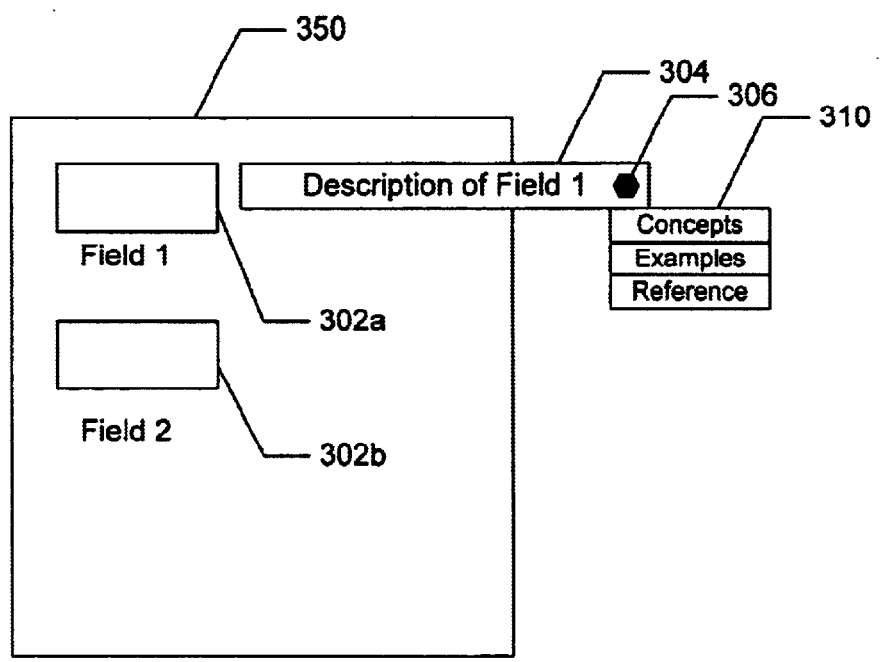

Once the analysis estimates the user's span of control in the system 100, the display of information and/or interface is provided based upon this estimate. For example, a help interface and topics might be rearranged to reflect the user's estimated span of control. FIGS. 3A and 3B show example interfaces in demonstration of the preferred embodiment of the method for dynamically determining the appropriate information and/or interface for presentation to differing users in accordance with the present invention.

FIG. 3A illustrates an interface with a dialog window 300 for a user with a broad span of control. A broad span of control leads to the assumption that the user is an expert and has the ability to perform a wide range of database operations, for example, operations involving all three fields 302a–302c. All three fields 302a–302c are thus displayed in the dialog window 300. When the expert user hovers a pointing device, such as a mouse pointer, over the first field 302a, a help mechanism 304 is activated. A description of the field 302a may be displayed in the help mechanism 304 along with the dialog window 300. If the expert user desires further help, he or she may select the GUI item 306, which triggers the display of a menu 308. For an expert user, the "Reference" topic is typically sought and is thus displayed at the top of the menu 308. The lower level "Concepts" and "Examples" topics, typically avoided by expert users, are lowered to the bottom of the menu 308.

FIG. 3B illustrates an interface with a dialog window 350 for a user with a narrow span of control. A narrow span of control leads to the assumption that the user is a novice and has a limited ability to perform database operations, for example, operations involving fields 302a and 302b but not field 302c. The fields 302a and 302b are thus displayed in the dialog window 350 but not field 302c. This avoids the waste of time where the novice user attempts to access the database operation involving field 302c, only to receive an error message. When the novice user hovers a pointing device over the first field 302a, the help mechanism 304 is activated. The novice user may select the GUI item 306, which triggers the display of a menu 310. However, the "Reference" topic is typically not sought by a novice user and is thus displayed at the bottom of the menu 310. The "Concepts" and "Examples" topics, typically sought by novice users, are displayed at the top of the menu 310. In this manner, the display of the information and/or interface is changed according to the user's span of control.

FIGS. 3A and 3B show a very simple change of the display based upon the estimate of a user's span of control. More complicated displays of information and/or interface any program may also be changed. For example, the method in accordance with the present invention may also be applied to wizards for a program or set of programs. The information and/or interface provided in a wizard may be changed according to the results of the analysis above. Expert users could be given additional/advanced options.

The analysis might be performed at any time and at more than one time. For example, when a user first starts using the program GUI on the client 102 and is not yet authenticated, the current user ID can be analyzed. Later, when the user attempts to perform an action that requires specific privileges and must go through the authentication process, typically involving the DBMS 108, the analysis can be performed again to verify that the current user ID was an appropriate choice. This approach can be customized depending on whether the system being accessed performs authentication at clients or at the server. By performing the initial analysis step, the GUI and information can be modified to suit the user while the user is browsing the structure tree. While the user is browsing the structure tree, the system 100 may assume the ID of the user is the same as an ID of a user known to be assigned to the client 102. This assumed user ID may be used to perform a preliminary analysis. When the user attempts to perform a database operation that requires authentication, the ID provided for authentication will be compared with the assumed ID gathered from the client 102. If they match, then no further analysis is necessary, and the original changes to the information and/or interface would stay the same. If they do not match, then a user other than the presumed user is accessing the system 100 through the client 102. The analysis may then be performed again with the authenticated user's ID, and the interface/information changed according to the results.

Although the present invention has been described in the context of DB2 and SQL92 compliant database systems, other database standards, and implementations thereof, may be used without departing from the spirit and scope of the present invention. Although the present invention has been described in the context of a RDBMS, one of ordinary skill in the art will understand that it may be applied to many other contexts without departing from the spirit and scope of the present invention.

A method and system for dynamically determining the appropriate information and/or interface for presentation to differing users has been disclosed. The present invention provides the means for information and graphical user interface (GUI) creators to present different information or GUIs to different user types, such as administrators and end users, and to different user experience levels, such as expert and novice, without requiring users to describe themselves. The present invention accomplishes this by performing a programmatic analysis of a user's rights within a system to derive type and experience level information using information already available according to the standards used by the system.

Although the present invention has been described in accordance with the embodiments shown, one of ordinary skill in the art will readily recognize that there could be variations to the embodiments and those variations would be within the spirit and scope of the present invention. Accordingly, many modifications may be made by one or ordinary skill in the art without departing from the spirit and scope of the appended claims.

What is claimed is:

1. A method for providing information and/or an interface in a computer system, comprising:
   (a) determining a user is accessing the system;
   (b) analyzing the user's type in the system without a need for the user to provide a user profile, wherein the user's type is based at least on privileges held by the user in the system, wherein the analyzing is not part of an authentication of the user for access to the system;
   (c) returning an estimate of the user's type based upon the analyzing step; and
   (d) displaying or modifying the information and/or the interface based upon the returned estimate.

2. The method of claim 1, wherein the analyzing step (b) comprises:
   (b1) estimating the user's type using data already available concerning the user's authorities and privileges according to a standard used by the system.

3. The method of claim 2, wherein the standard concerns a system which comprises structured data and user information stored with the structured data.

4. The method of claim 3, wherein the standard is a relational database standard, wherein the data comprises at least one of:
   an authority role;
   ability to create or modify tables of a database;
   ability to create or modify schemas;
   ability to create, modify, or access database views;
   authority to grant or revoke privileges;
   number of privileges granted; and
   ability to create or execute packages and/or database programmatic constructs.

5. The method of claim 1, wherein the displaying step (d) comprises:
   (d1) displaying or modifying help information presentation and/or a help user interface based upon the returned estimate.

6. The method of claim 1, wherein the displaying step (d) comprises:
   (d1) displaying the information and/or the interface for a wizard based upon the returned estimate.

7. A computer readable medium with program instructions for providing information and/or an interface in a computer system, the instructions for:
   (a) determining that a user is accessing the system;
   (b) analyzing the user's type in the system without a need for the user to provide a user profile, wherein the user's type is based at least on privileges held by the user in the system wherein the analyzing is not part of an authentication of the user for access to the system;
   (c) returning an estimate of the user's type based upon the analyzing instructions; and
   (d) displaying or modifying the information and/or the interface based upon the returned estimate.

8. The medium of claim 7, wherein the analyzing instruction (b) comprises instructions for:
   (b1) estimating the user's type using data already available concerning the user's authorities and privileges according to a standard used by the system.

9. The medium of claim 8, wherein the standard concerns a system which comprises structured data and user information stored with the structured data.

10. The medium of claim 9, wherein the standard is a relational database system standard, wherein the data comprises at least one of:
    an authority role;
    ability to create or modify tables of a database;
    ability to create or modify schemas;
    ability to create, modify, or access database views;
    authority to grant or revoke privileges;
    number of privileges granted; and
    ability to create or execute packages and/or database programmatic constructs.

11. The medium of claim 7, wherein the displaying instruction (d) comprises instructions for:
    (d1) displaying or modifying a help information presentation and/or a help user interface based upon the returned estimate.

12. The medium of claim 7, wherein the displaying instruction (d) comprises instructions for:
    (d1) displaying or modifying the information and/or the interface for a wizard based upon the returned estimate.

13. A method for providing information and/or an interface in a computer system, comprising:
    (a) determining that a user is accessing the system;
    (b) estimating the user's type in the system after authenticating the user, using data already available concerning the user's authorities and privileges according to a standard used by the system, without a need for the user to provide a user profile, wherein the estimating is not part of an authentication of the user for access to system;
    (c) returning an estimate of the user's type; and
    (d) displaying or modifying the information and/or the interface based upon the returned estimate.

14. The method of claim 13, wherein the standard concerns a system which comprises structured data and user information stored with the structured data.

15. The method of claim 14, wherein the standard is a relational database standard, wherein the data comprises at least one of:
    an authority role;
    ability to create or modify tables of a database;
    ability to create or modify schemas;
    ability to create, modify, or access database views;
    authority to grant or revoke privileges;
    number of privileges granted; and
    ability to create or execute packages and/or database programmatic constructs.

16. A computer readable medium with program instructions for providing information and/or an interface in a computer system, the instructions for:
    (a) determining that a user is accessing the system;
    (b) estimating the user's type in the system, using data already available concerning the user's authorities and privileges according to a standard used by the system, without a need for the user to provide a user profile, wherein the analyzing is not part of an authentication of the user for access to the system;
    (c) returning an estimate of the user's type; and
    (d) displaying or modifying the information and/or the interface based upon the returned estimate.

17. The method of claim 16, wherein the standard concerns a system which comprises structured data and user information stored with the structured data.

18. The medium of claim 17, wherein the standard is a relational database system standard, wherein the data comprises at least one of:

an authority role;
ability to create or modify tables of a database;
ability to create or modify schemas;
ability to create, modify, or access database views;
authority to grant or revoke privileges;
number of privileges granted; and
ability to create or execute packages and/or database programmatic constructs.

19. A system, comprising:
a plurality of databases;
a server coupled to the plurality of databases; and
a plurality of clients coupled to the server,
wherein each of the plurality of clients comprises a program,
wherein a user may access the plurality of databases through the program,
wherein information and/or an interface is displayed or modified for the program based upon an estimate of the user's type in the system without a need for the user to provide a user profile, wherein the user's type is based at least on privileges held by the user in the system, wherein determining the estimate of the user's type is not part of an authentication of the user for access to the system.

* * * * *